(12) United States Patent
Lee

(10) Patent No.: US 7,372,015 B2
(45) Date of Patent: May 13, 2008

(54) BEAM DETECTOR AND LIGHT SCANNER UNIT HAVING THE SAME

(75) Inventor: Tae-kyoung Lee, Seongnam-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 98 days.

(21) Appl. No.: 11/265,184

(22) Filed: Nov. 3, 2005

(65) Prior Publication Data

US 2006/0237638 A1    Oct. 26, 2006

(30) Foreign Application Priority Data

Apr. 22, 2005    (KR) ............ 10-2005-0033546

(51) Int. Cl.
  *H01J 3/14*   (2006.01)
  *G01B 11/26*  (2006.01)
  *H04N 1/04*   (2006.01)

(52) U.S. Cl. .......... 250/234; 250/216; 356/141.4; 358/474

(58) Field of Classification Search .......... 250/201.3, 250/234, 235, 236, 216; 358/474, 475, 476, 358/490, 494; 356/3.07, 3.09, 139.1, 141.1, 356/141.4

See application file for complete search history.

(56) References Cited

U.S. PATENT DOCUMENTS 5,663,558 A * 9/1997 Sakai .......... 250/234
6,362,470 B1 * 3/2002 Yoshida et al. .......... 250/235

FOREIGN PATENT DOCUMENTS

| EP | 1085743 | 3/2001 |
|----|---------|--------|
| JP | 5-34619 | 2/1993 |
| JP | 8-132670 | 5/1996 |
| JP | 9-197307 | 7/1997 |
| JP | 10-142541 | 5/1998 |
| JP | 2001-159738 | 6/2001 |
| JP | 2003-156701 | 5/2003 |
| KR | 2000-71292 | 11/2000 |
| KR | 2001-67173 | 7/2001 |

OTHER PUBLICATIONS

Korean Office Action dated Aug. 30, 2006 issued in KR 2005-33546.
Chinese Office Action dated Jun. 1, 2007 issued in CN 1006100777326.

* cited by examiner

*Primary Examiner*—Georgia Epps
*Assistant Examiner*—Don Williams
(74) *Attorney, Agent, or Firm*—Stanzione & Kim, LLP

(57) ABSTRACT

A beam detector includes a beam detection sensor to receive a light beam emitted from a light source of a light scanning unit and to generate a synchronous signal, a slit member having a slit formed therein to control a time to generate the synchronous signal of the beam detection sensor by adjusting an amount of the light beam received by the beam detection sensor, and a holder in which the slit member is installed. The slit is extended in a vertical direction and, a pair of surfaces form the slit and face each other, one of the pair of surfaces at which a scanned light beam arrives first is inclined in the vertical direction.

37 Claims, 6 Drawing Sheets

BEAM DETECTOR AND LIGHT SCANNER UNIT HAVING THE SAME

CROSS-REFERENCE TO RELATED APPLICATIONS

This application claims the benefit under 35 U.S.C. §119 from Korean Patent Application No. 2005-33546, filed on Apr. 22, 2005, in the Korean Intellectual Property Office, the disclosure of which is incorporated herein in its entirety by reference.

BACKGROUND OF THE INVENTION

1. Field of the Invention

The present general inventive concept relates to a light scanning unit, and more particularly, to a beam detector generating a synchronous signal by detecting a light beam and a light scanning unit having the same.

2. Description of the Related Art

Light scanning units such as laser scanning units (LASS) are used for image forming apparatuses such as copiers and laser printers. A light scanning unit scans light emitted from a light source onto a photosensitive medium of an image forming apparatus to form an electrostatic latent image on an outer circumference surface of the photosensitive medium. A beam detector for generating a synchronous signal by receiving a light beam emitted from the light source is provided in the light scanning unit.

FIG. 1 is a cross-sectional view of a conventional beam detector 10. Referring to FIG. 1, the beam detector 10 includes a beam detection sensor 12 having a light receiving portion 13 for receiving a light beam, a slit member 20 having a slit 21 for controlling a time when a synchronous signal of the beam detection sensor 12 is generated by partially blocking the light beam incident on the light receiving portion 13, and a beam convergence lens 15 for focusing the light beam passing through the slit 21. The slit member 20 of the beam detector 10 is displaced in a horizontal direction as indicated by an arrow, earlier or later than the time when the synchronous signal of the beam detection sensor 12 is generated. However, since an amount of horizontal displacement of the slit member 20 cannot be accurately controlled, it is difficult to accurately control the time of generating the synchronous signal.

SUMMARY OF THE INVENTION

To solve the above and/or other problems, the present general inventive concept provides a beam detector which can accurately control a time to generate a synchronous signal, and a light scanning unit having the same.

The present general inventive concept provides a beam detector which can easily control a time to generate a synchronous signal, and a light scanning unit having the same.

Additional aspects and advantages of the present general inventive concept will be set forth in part in the description which follows and, in part, will be obvious from the description, or may be learned by practice of the general inventive concept.

The foregoing and/or other aspects of the present general inventive concept may be achieved by providing a beam detector usable with a light scanning unit including a beam detection sensor to receive a light beam emitted from a light source of a light scanning unit and to generate a synchronous signal according to the received beam light, a slit member having a slit formed therein to control a time to generate the synchronous signal of the beam detection sensor by adjusting an amount of the light beam received by the beam detection sensor through the slit, and a holder in which the slit member is installed, wherein the slit is extended in a vertical direction and includes a pair of surfaces facing each other to form the slit, at least one of the surfaces at which a scanned light beam arrives first is inclined with respect to the vertical direction so that the width of the slit varies.

The slit may have the width of the slit varying along the vertical direction in a plane perpendicular to a propagation direction of the light beam. The slit member may be inserted in the holder in the vertical direction. The holder may comprise a pair of guide grooves to guide a change in the position of the slit member with respect to the holder in the vertical direction, and the slit member may comprise a tension portion that elastically presses one of the guiding grooves to prevent the slit member from sliding.

An upper end portion and a lower end portion of the slit member may contact the guiding grooves so that the slit member is not inclined with respect to the holder. The pair of surfaces of the slit and may be inclined such that the width of the slit decreases in a direction in which the light beam propagates. The beam detector may further include a beam convergence lens disposed in front of or after the slit member along a propagation direction of the light beam to focus the light beam.

The foregoing and other aspects of the present general inventive concept may also be achieved by providing a light scanning unit including a light source and a beam detector to receive a light beam emitted from the light source and to generate a synchronous signal according to the received light beam, the beam detector including a beam detection sensor to receive the light beam and to generate the synchronous signal according to the received light beam, a slit member having a slit formed therein to control a time to generate the synchronous signal of the beam detection sensor by adjusting an amount of the light beam received by the beam detection sensor, and a holder in which the slit member is installed, wherein the slit is extended in a vertical direction and includes a pair of surfaces facing each other to define the slit, and at least one of the surfaces at which a scanned light beam arrives first from the light source is inclined with respect to the vertical direction.

The foregoing and other aspects of the present general inventive concept may also be achieved by providing a beam detector usable with an image forming apparatus, the beam detector including a beam sensor part to receive a light beam from a light source and to generate a signal upon receiving the light beam, and a slit member disposed between the beam sensor part and the light source and having a slit through which the light beam passes toward the beam sensor part, the slit having a variable width to control a time when the light beam propagates to the beam sensor part.

The foregoing and other aspects of the present general inventive concept may also be achieved by providing an image-forming apparatus including a light source to generate light beam, a deflecting unit to direct the light beam toward a scanning surface, and a beam detector to receive a portion of the directed light beam, the beam detector including a slit member having a slit defined by a plurality of surfaces to pass the portion of the directed light beam, one of the plurality of surfaces being inclined with respect to one other of the plurality of surfaces, and a beam sensor part to receive the portion of the directed light beam through the slit and to generate a signal according the received portion of the directed beam.

The foregoing and other aspects of the present general inventive concept may also be achieved by providing a method of controlling a time when a light beam moving in a sweeping direction defining a sweeping surface reaches a beam detector, the method including selecting a value of a slit width in a light beam the sweeping direction, the light beam passing through a slit member surrounding a slit having the slit width to reach the beam detector, and positioning a slit member by sliding the slit member in a holder on a direction perpendicular to the sweeping surface, such that the slit to have the selected slit width value in the light beam sweeping direction, when the slit is defined by a first surface where the light beam arrives first while moving in the sweeping direction and a second surface perpendicular on the sweeping surface, and the first surface is slanted towards the second surface.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
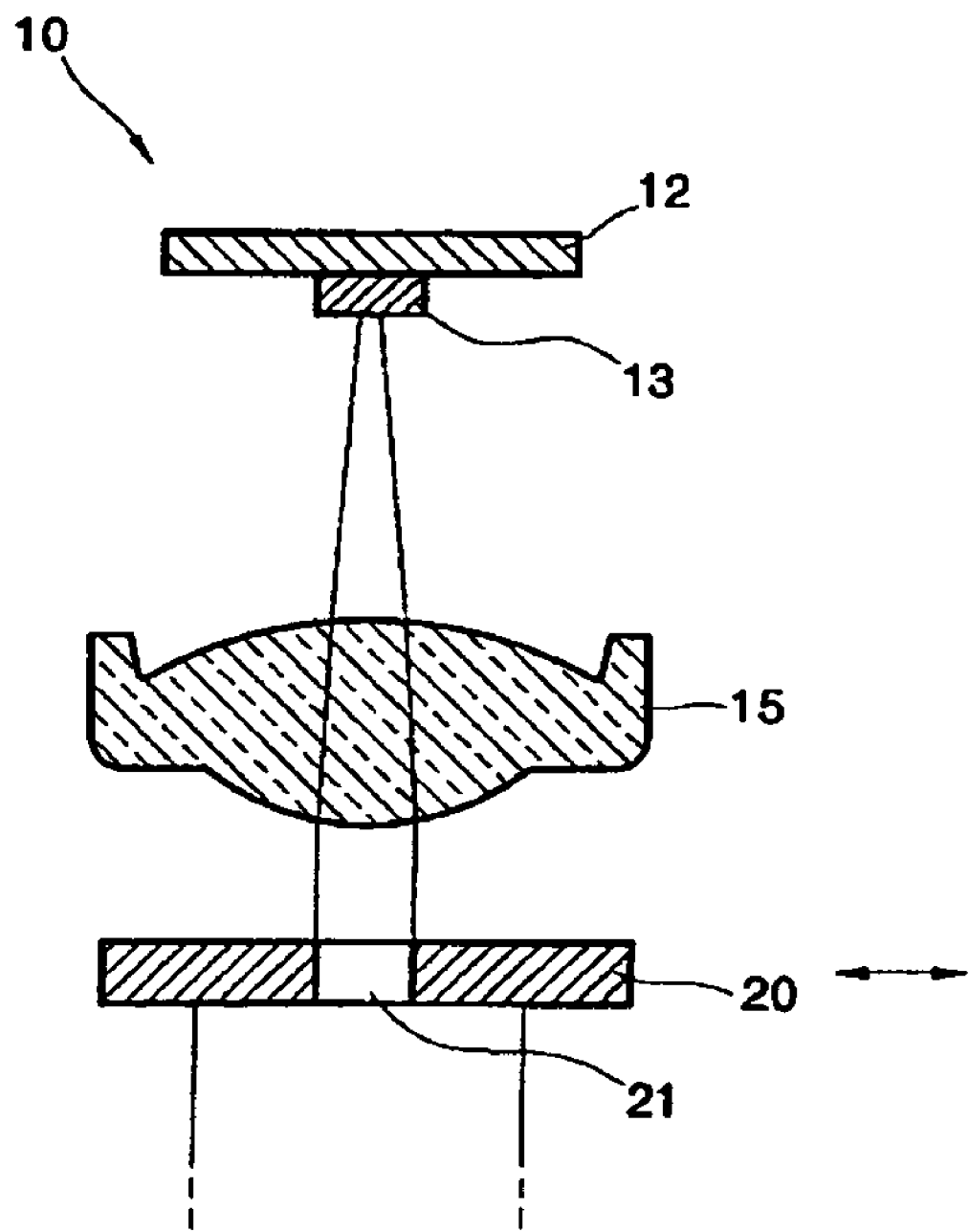
FIG. 1 is a cross-sectional view of a conventional beam detector.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 2:
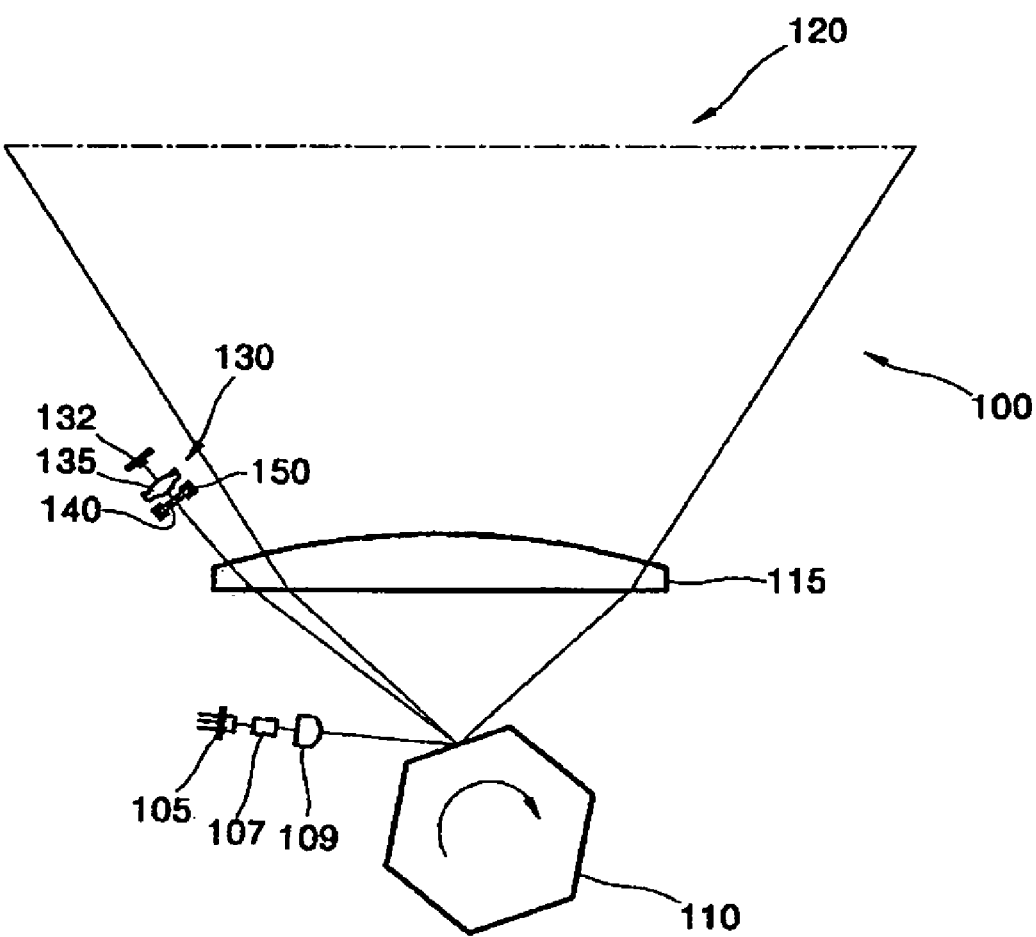
FIG. 2 is a view illustrating a light scanning unit according to an embodiment of the present general inventive concept.

Referring to FIG. 2, a light scanning unit 100 according to an embodiment of the present general inventive concept scans a light beam onto a photosensitive medium (not shown) of an electrophotographic image forming apparatus to form an electrostatic latent image on the photosensitive medium. The light scanning unit 100 includes a light source 105 to emit a light beam, a light deflector having a rotary polygonal mirror 110 with a plurality of mirror surfaces to deflect the light beam emitted from the light source 105, an image forming optical system to form an image on a scanned surface 120, that is, an image forming surface of the photosensitive medium, using the light beam deflected by the rotary polygonal mirror 110, and a beam detector 130 to generate a synchronous signal, for example, a horizontal synchronization signal, using a portion of the light beam deflected by the rotary polygonal mirror 110. Also, the light scanning unit 100 further includes a light source control unit to switch on/off of the light source 105 in response to an image signal, a collimating lens 107 to convert the light beam emitted from the light source 105 as a divergent light into a convergent light or a parallel light, and a cylinder lens 109 having different refractive powers according to a main scanning direction and a sub-scanning direction, to form an image on the mirror surface of the rotary polygonal mirror 110 using the light beam emitted from the light source 105.

The light source 105 may have a single or a plurality of light sources having a single or a plurality of light emitting points. The light source 105 may include a laser diode LD emitting a laser beam.

The light deflector scans the light beam at a constant linear velocity in a horizontal direction with respect to the scanned surface 120, that is, in the sub-scanning direction, and includes the rotary polygonal mirror 110 having a regular hexagonal shape and a driving source (not shown) such as a motor to rotate the rotary polygonal mirror 110. The rotary polygonal mirror 110 is rotated clockwise by the driving source at a constant velocity.

The image forming optical system forms an image on the scanned surface 120 by correcting aberration of the light beam deflected by the rotary polygonal mirror 110 and includes an f-θ lens 115. The f-θ lens 115 forms the image in accordance with an f-θ condition and, therefore, correcting a special type of distortion. The f-θ lens 115 forms the image using the light beam deflected by the rotary polygonal mirror 110 having different refractive powers according to the main scanning direction and the sub-scanning direction.

Figure 3:
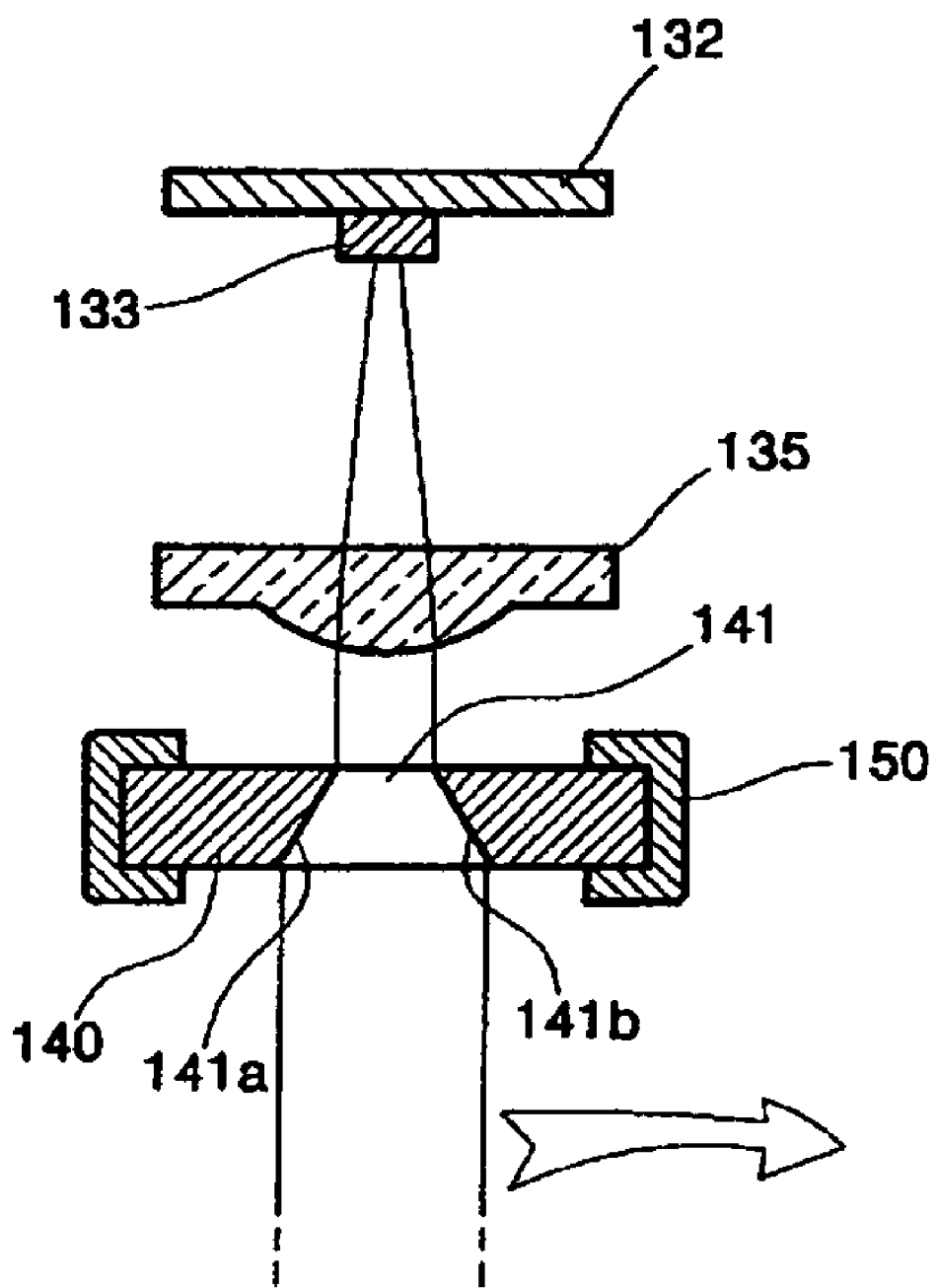
FIGS. 3 and 4 are a cross-sectional view and an exploded perspective illustrating a beam detector of the light scanning unit of FIG. 2.
Figure 4:
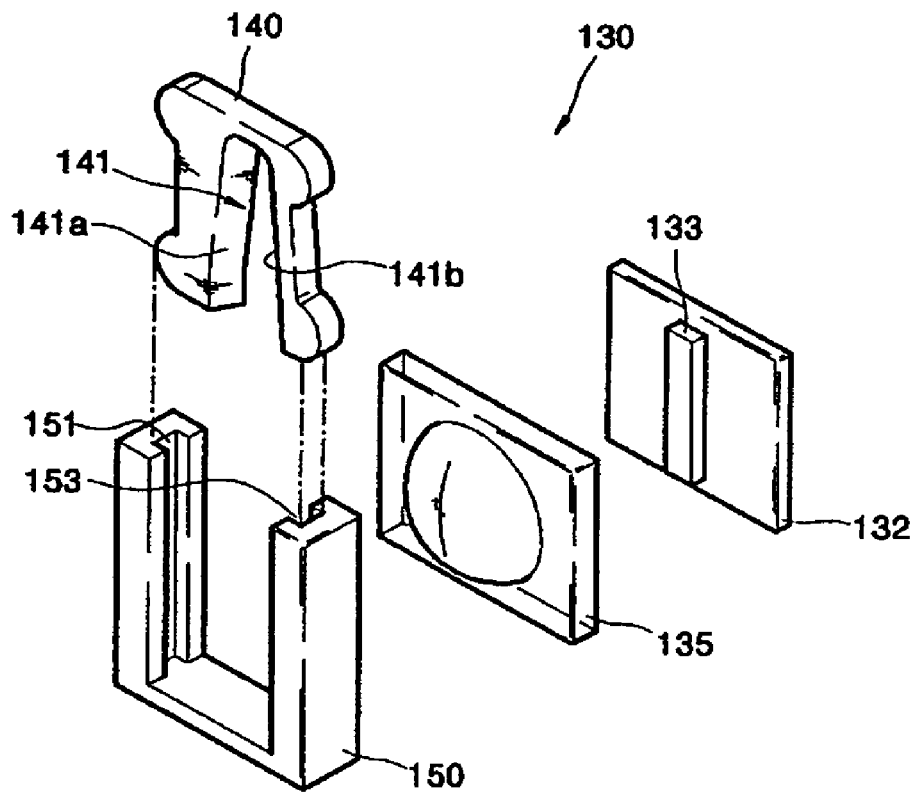

Referring to FIGS. 2 through 4, the beam detector 130 includes a slit member 140, a beam convergence lens 135, and a beam detection sensor 132, which are arranged in a series along a propagating path of the light beam deflected by the rotary polygonal mirror 110.

The beam detection sensor 132 may be a photoconductive cell utilizing a photoconductive effect. When an amount of light incident on a light receiving portion 133 of the beam detection sensor 132 exceeds a predetermined value, the beam detection sensor 132 is saturated and becomes electrically conductive, and therefore, the synchronous signal is generated. Since the beam detection sensor 132 is well known, a detailed description thereof will be omitted herein.

A slit 141 is formed in the slit member 140 to control a time to generate a synchronous signal of the beam detection sensor 132 by adjusting the amount of the light beam received by the light receiving portion 133 of the beam detection sensor 132. The slit 141 is extended in a vertical direction, i.e. an optical axis. A first surface of the slit 141a and a second of the slit 141b form the slit 141 and are arranged to face each other with respect to the vertical direction. The first surface 141a of the slit 141 is inclined with respect to the vertical direction. The light beam deflected by the rotary polygonal mirror 110 is scanned from a left side to a right side as indicated by an arrow in FIG. 3. The light beam is first incident on the first surface 141a of the slit 141 before being incident on the second surface 141b of the slit 141. The first surface 141 a is inclined by a predetermined angle with respect to the second surface 141b such that a width of the slit 141 increases from an upper portion of the slit 141 to a lower portion thereof. That is, the width of the slit 141 decreases from an incident portion of the slit 141 to an exit portion of the slit 141 along the optical axis.

Referring to FIG. 3, the first and second surfaces 141a and 141b forming the slit 141 are inclined such that the width of the slit 141 decreases along a direction in which the light beam propagates toward the beam detection sensor 132. Thus, the time to generate the synchronous signal of the beam detection sensor 132 does not interfere with a diffused reflection of the light beam incident on the first and second surfaces 141a and 141b.

The beam convergence lens 135 to focus the light beam passing through the slit 141 to be incident on the light receiving portion 133 of the beam detection sensor 132 may be located between the slit member 140 and the beam detection sensor 132. Although in the present embodiment the beam convergence lens 135 is located behind the slit member 140 along a propagation path of the light beam, the beam convergence lens 135 can also be located in front of the slit member 140.

The slit member 140 is vertically inserted in a holder 150 fixedly installed on a housing (not shown) of the light scanning unit 100. A pair of guiding grooves, that is, a first guiding groove 151 and a second guiding groove 153, is provided in the holder 150, to extend vertically such that the slit member 140 is inserted by sliding from an upper side thereof to a lower side thereof.

Figure 6:
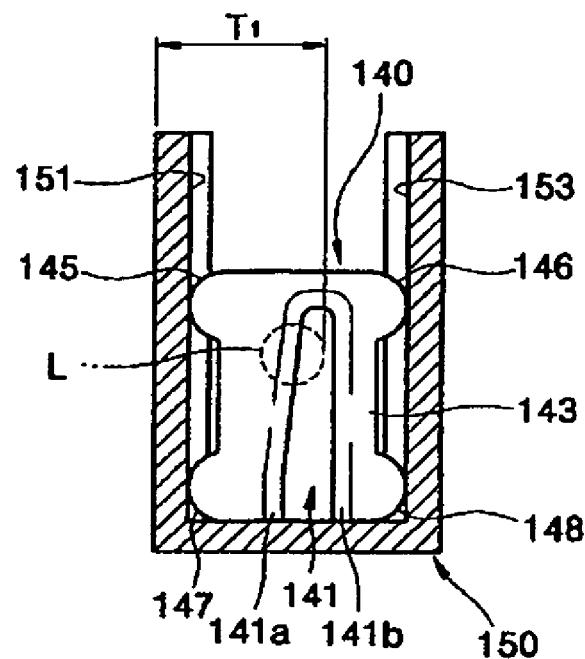
FIGS. 6 through 8 are views illustrating changes in time to generate a beam detection signal in the light scanning unit of FIG. 2.
Figure 7:
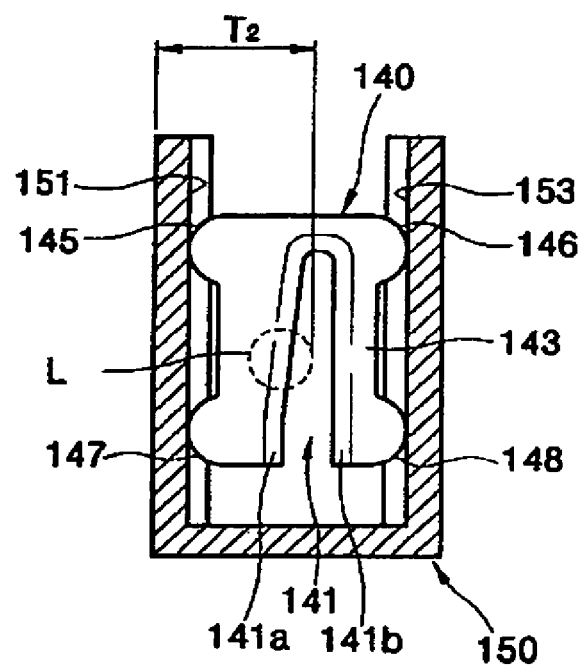
Figure 8:
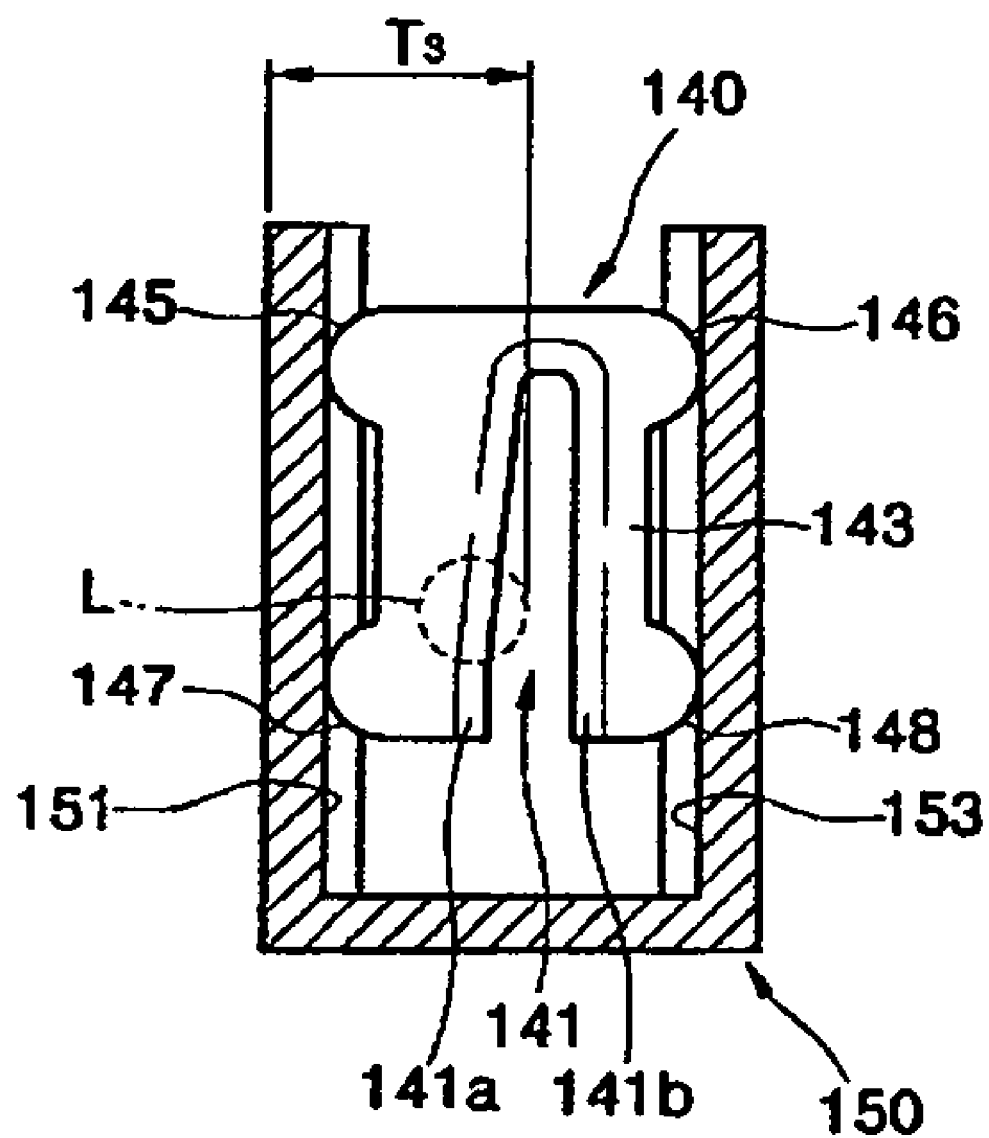

Referring to FIGS. 6 through 8, the slit member 140 includes a first upper contact portion 145 and a first lower contact portion 147, which contact the first guide groove 151 when the slit member 140 is inserted in the holder 150. The slit member 140 further includes a second upper contact portion 146 and a second lower contact portion 148, which contact the second guide groove 153 when the slit member 140 is inserted in the holder 150. Thus, since each side portion of the slit member 140 contacts the first guide groove 151 or the second guide groove 153 at two upper and lower points, the slit member 140 inserted in the holder 150 is not inclined with respect to the holder 150 in spite of an unexpected external interference.

Figure 5:
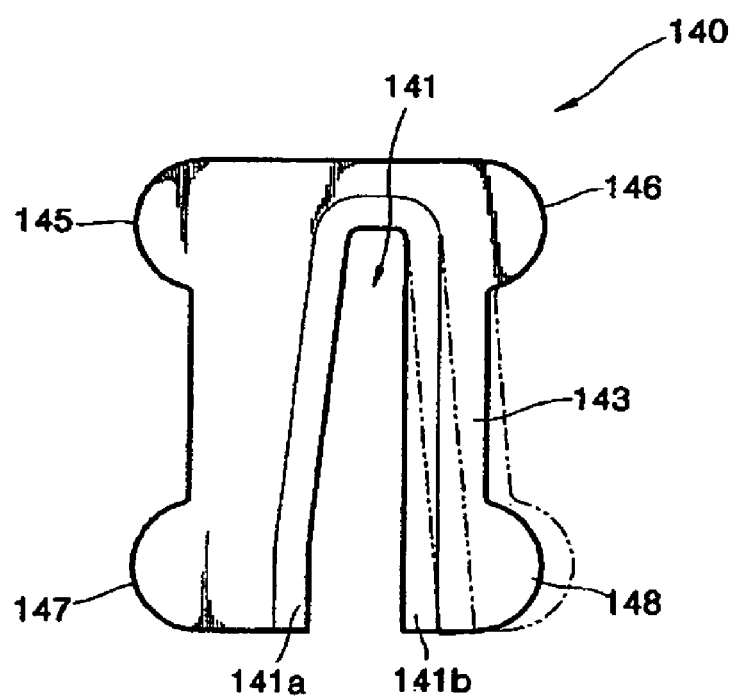
FIG. 5 is a front view illustrating a slit member of the beam detector of FIG. 4.

Referring to FIG. 5, the slit 141 of the slit member 140 is open to the bottom of the slit member 140 in an insertion direction. When the slit member 140 is not inserted in the holder 150, the right side of the slit member 140 including the second surface 141b is slightly open wider than when the slit member 140 is inserted in the holder 150, as indicated by a dash line in FIG. 5, such that the second lower contact portion 148 protrudes further to the right than the second upper contact portion 146. The right side of the slit member 140 is a tension portion 143 which is elastically biased to be open wider so that the slit member 140 exerts a pressure on the guiding grooves 151 and 153 when the width of the slit 141 decreases while the slit member 140 is inserted in the holder 150. When the slit member 140 with the tension portion 143 is manually pressed to be inserted in the holder 150, and then the tension portion 143 is released, the tension portion 143 tends to open wider because of an elastic restoration force. Accordingly, the second lower contact portion 148 elastically presses the second guide groove 153 so that the slit member 140 is firmly installed in the holder 150 without sliding therein.

The beam detector 130 can easily adjust the time to generate the synchronous signal by moving the slit member 140 up and down with respect to the holder 150. Referring to FIG. 6, the slit member 140 is installed at a lower position of the holder 150 such that the slit member 140 almost touches the bottom of the holder 150. A light beam L deflected by the rotary polygonal mirror 110 of FIG. 2 is scanned from the left to the right to pass through the upper portion of the slit 141. The beam detection sensor 132 of FIG. 3 generates the synchronous signal at a time T1 when the light saturates the light receiving portion 133. After a predetermined time passes from the time at which the synchronous signal is generated, the light source 105 of FIG. 2 starts to emit a light beam corresponding to an image signal.

Referring to FIG. 7, the slit member 140 is disposed at a middle position in the holder 150 compared to the lower position illustrated in FIG. 6. The light beam L deflected by the rotary polygonal mirror 110 of FIG. 2 is scanned from the left to the right to pass through a middle portion of the slit 141. The beam detection sensor 132 of FIG. 3 generates the synchronous signal at a time T2 when the light beam saturates the light receiving portion 133. In the case of FIG. 7, compared to the case of FIG. 6, the light beam L is incident on the light receiving portion 133 at an earlier time due to the inclination of the first surface 141a forming the slit 141. Thus, the time T2 of FIG. 7 when the light receiving portion 133 is saturated and the synchronous signal is generated is earlier than the time T1 of FIG. 6.

Referring to FIG. 8, the slit member 140 is disposed at an upper position in the holder 150 compared to the middle position illustrated in FIG. 7 The light beam L deflected by the rotary polygonal mirror 110 of FIG. 2 is scanned from the left to the right to pass through the lower portion of the slit 141. The beam detection sensor 132 of FIG. 3 generates the synchronous signal at a time T3 when the light beam saturates the light receiving portion 133. In the case of FIG. 8, compared to the case of FIG. 7, the light beam L is incident on the light receiving portion 133 at an earlier time due to the inclination of the first surface 141a forming the slit 141. Thus, the time T3 of FIG. 8 when the light receiving portion 133 is saturated and the synchronous signal is generated is earlier than the time T1 of FIG. 6 and the time T2 of FIG. 7. Here, a relative movement between the slit member 140 and the holder 150 can be controlled manually or automatically using a control unit (not shown).

As described above, by using the beam detector according to the present general inventive concept and the light scanner having the same, the time to generate a synchronous signal can be easily and accurately controlled by moving the slit member up and down in the holder. Thus, in the electrophotographic image forming apparatus including the light scanning unit, the left margin of a print paper can be uniformly maintained.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A beam detector usable with a light scanning unit comprising:
    a beam detection sensor to receive a light beam emitted from a light source and to generate a synchronous signal according to the received light beam;
    a slit member having a slit formed therein to control a time to generate the signal of the beam detection sensor by adjusting an amount of the light beam received by the beam detection sensor through the slit; and
    a holder in which the slit member is installed,
    wherein the slit is extended in a vertical direction and comprises a pair of surfaces facing each other to form the slit, and at least one of the surfaces at which a scanned light beam arrives first is inclined with respect to the vertical direction so that the width of the slit varies along the vertical direction and the width of the slit is variable according to a movement of the slit member in the vertical direction.

2. The beam detector as claimed in claim 1, wherein the width of the slit varies along the vertical direction in a plane perpendicular to a propagation direction of the light beam.

3. The beam detector as claimed in claim 1, wherein the slit member is inserted in the holder in the vertical direction.

4. The beam detector as claimed in claim 3, wherein:
the holder comprises a pair of guiding grooves to guide a change in a position of the slit member with respect to the holder in the vertical direction; and
the slit member comprises a tension portion that elastically presses one of the guiding grooves to prevent the slit member from sliding.

5. The beam detector as claimed in claim 4, wherein the slit member comprises an upper end portion and a lower end portion to contact the guiding grooves so that the slit member is not inclined with respect to the holder.

6. The beam detector as claimed in claim 1, wherein the pair of surfaces of the slit are inclined such that the width of the slit decreases in a direction in which the light beam propagates.

7. The beam detector as claimed in claim 1, further comprising:
a beam convergence lens disposed in front of or after the slit member along a propagation direction of the light beam to focus the light beam.

8. A light scanning unit comprising a light source and a beam detector to receive a light beam emitted from the light source and to generate a synchronous signal according to the received light beam, the beam detector comprising:
a beam detection sensor to receive the light beam and to generate the signal according to the received light beam;
a slit member having a slit formed therein to control a time to generate the synchronous signal of the beam detection sensor by adjusting an amount of the light beam received by the beam detection sensor through the slit; and
a holder in which the slit member is installed,
wherein the slit is extended in a vertical direction and comprises a pair of surfaces facing each other to define the slit, and at least one of the surfaces at which a scanned light beam arrives first from the light source is inclined with respect to the vertical direction to vary the width of the slit along the vertical direction, and the width of the slit through which the light beam passes is adjusted according to a movement of the slit member in the vertical direction.

9. The light scanning unit as claimed in claim 8, wherein the slit has a width that varies along the vertical direction in a plane perpendicular to a propagation direction of the light beam.

10. The light scanning unit as claimed in claim 8, wherein the slit member is inserted in the holder in the vertical direction.

11. The light scanning unit as claimed in claim 10, wherein:
the holder comprises a pair of guiding grooves to guide a change in a position of the slit member with respect to the holder in the vertical direction; and
the slit member comprises a tension portion that elastically presses one of the guiding grooves to prevent the slit member from sliding.

12. The light scanning unit as claimed in claim 11, wherein the slit member comprises an upper end portion and a lower end portion to contact the guiding grooves so that the slit member is not inclined with respect to the holder.

13. The light scanning unit as claimed in claim 8, wherein the pair of surfaces of the slit are inclined such that the width of the slit decreases in a direction in which the light beam propagates.

14. The light scanning unit as claimed in claim 8, further comprising:
a beam convergence lens disposed in front of or after the slit propagating direction of the light beam to focus the light beam.

15. A beam detector usable with an image forming apparatus, the beam detector comprising:
a beam sensor part to receive a light beam from a light source and to generate a signal upon receiving the light beam; and
a slit member disposed between the beam sensor part and the light source and having a slit through which the light beam passes toward the beam sensor part, the slit having a variable width to control a time when the light beam propagates to the beam sensor part,
wherein the width of the slit through which the light beam passes is adjusted according to a movement of the slit member in a direction perpendicular to a light beam propagation direction.

16. The beam detector as claimed in claim 15, wherein the slit extends on a direction perpendicular to a light beam propagation direction, and the light beam passes through a portion of the variable width of the slit to control the time.

17. The beam detector as claimed in claim 16, wherein the slit member is inserted in a holder in a plane perpendicular on a light beam propagation direction and to change a position of the slit member with respect to the holder.

18. The beam detector as claimed in claim 17, wherein:
the holder has a pair of guiding grooves to allow the slit member to be inserted by sliding in a direction perpendicular on the light propagation direction; and
the slit member is elastically strained to slide through the pair of grooves of the holder.

19. The beam detector as claimed in claim 16, wherein:
the slit comprises a first surface and a second surface inclined with respect to the light beam propagation direction; and
the first surface is inclined with respect to the second surface.

20. The beam detector as claimed in claim 15, wherein the beam sensor part comprises:
a light receiving portion to receive the light beam through the slit; and
a photoconductive cell to generate the signal according to the received light beam.

21. An image-forming apparatus, comprising:
a light source to generate light beam;
a deflecting unit to direct the light beam toward a scanning surface; and
a beam detector to receive a portion of the directed light beam, the beam detector comprising,
a slit member having a slit defined by a plurality of surfaces to pass the portion of the directed light beam, one of the plurality of surfaces being inclined with respect to one other of the plurality of surfaces such that the light beam passing between the inclined surface and the one other surface is shaped by the inclined surface and the one other surface, and
a beam sensor part to receive the portion of the directed light beam through the slit and to generate a signal according the received portion of the directed beam, wherein a width of the slit defined by the plurality of surfaces varies along a vertical direction of the slit, and a time to generate the signal is controlled by a vertical movement of the slit member.

22. The image-forming apparatus as claimed in claim 21, wherein:
the light beam is directed from the deflecting unit toward the beam detector along an optical axis of the light beam; and
the plurality of surfaces are inclined with respect to the optical axis.

23. The image-forming apparatus as claimed in claim 21, wherein the slit is inclined with respect to a line perpendicular to an optical axis of the light beam.

24. The image-forming apparatus as claimed in claim 21, wherein:
the beam detector comprises a holder to accommodate the slit member; and
the slit has a first variable width before the slit member is disposed in the holder, and a second variable width after the slit member is disposed in the holder.

25. The image-forming apparatus as claimed in claim 21, wherein the slit member comprises a first portion having the one surface and a second portion having the one other surface, respectively, and the first portion is elastically connected to the second portion.

26. The image-forming apparatus as claimed in claim 21, wherein:
the light beam is movable between the plurality of surfaces of the slit member in a moving direction; and
the plurality of surfaces of the slit member is inclined with respect to the moving direction.

27. The image-forming apparatus as claimed in claim 21, wherein the light beam moves in a moving direction between the plurality of surfaces of the slit member, and the plurality of surfaces form angles with the moving direction.

28. The image-forming apparatus as claimed in claim 21, wherein the slit comprises a slit portion having a first width and a second beam portion having a second width, and the light beam moves through one of the first and the second slit portions.

29. The image-forming apparatus as claimed in claim 21, wherein the light beam passes through the slit of the slit member in a direction, and the first surface and second surface form a first angle and a second angle with a line perpendicular to the direction, respectively.

30. The image-forming apparatus as claimed in claim 21, wherein the slit member is movable in a direction with respect to the beam sensor part, and the slit is inclined with respect to the direction.

31. The image-forming apparatus as claimed in claim 21, wherein the light beam is movable to pass through a portion of the slit in a direction, and the slit has an angle with the direction so as to control a time when the signal is generated according to a position of the portion of the slit.

32. A method of controlling a time when a light beam moving in a sweeping direction defining a sweeping surface reaches a beam detector, the method comprising:
selecting a value of a slit width in a light beam the sweeping direction, the light beam passing through a slit member surrounding a slit having the slit width to reach the beam detector; and
positioning a slit member by sliding the slit member in a holder along a direction perpendicular to the sweeping surface, such that the slit is positioned to have the selected slit width value in the light beam sweeping direction, when the slit is defined by a first surface where the light beam arrives first while moving in the sweeping direction and a second surface perpendicular on the sweeping surface, and the first surface is slanted towards the second surface.

33. The method as in claim 32, wherein selecting a value of a slit width includes choosing one of a plurality of width values.

34. The method as in claim 32, wherein the adjusting a width of a slit includes choosing a width between a lowest width value and a highest width value.

35. A beam detector usable in an image forming apparatus, comprising:
a beam detection unit to receive a light beam from a light source and to generate a synchronous signal according to the received light beam;
a slit member to define a slit through which the light beam passes toward the beam detection unit; and
a holder to hold the slit member at a plurality of positions,
wherein a width of the slit varies in a vertical direction, and the holder holds the slit member at a plurality of vertical positions defining different slit widths to control a time to generate the synchronous signal.

36. The beam detector of claim 35, wherein the vertical direction corresponds to a direction perpendicular to an optical axis of the light beam.

37. The beam detector of claim 36, wherein the slit member slides within the holder along the vertical direction, and is maintained at the plurality of positions by an elastic force of the slit member against the holder.

\* \* \* \* \*